United States Patent
Agrawal et al.

(10) Patent No.: US 10,754,611 B2
(45) Date of Patent: Aug. 25, 2020

(54) FILTERING SOUND BASED ON DESIRABILITY

(71) Applicant: International Business Machines Corporation, Armonk, NY (US)

(72) Inventors: Priyanka Agrawal, Bangalore (IN); Pankaj S. Dayama, Bangalore (IN); Amit Anil Nanavati, New Delhi (IN); Amrita Saha, Bangalore (IN); Srikanth Govindaraj Tamilselvam, Chennai (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/960,285

(22) Filed: Apr. 23, 2018

(65) Prior Publication Data
US 2019/0324709 A1    Oct. 24, 2019

(51) Int. Cl.
G06F 3/16 (2006.01)
G06F 3/01 (2006.01)
G06N 20/00 (2019.01)
H04R 29/00 (2006.01)

(52) U.S. Cl.
CPC ............. *G06F 3/165* (2013.01); *G06F 3/017* (2013.01); *G06F 3/167* (2013.01); *G06N 20/00* (2019.01); *H04R 29/00* (2013.01)

(58) Field of Classification Search
CPC .......... G06F 3/017; G06F 3/165; G06F 3/167; G06N 99/005; H04R 29/00
USPC ........................................................... 700/94
See application file for complete search history.

(56) References Cited

U.S. PATENT DOCUMENTS

| | | | |
|---|---|---|---|
| 5,355,418 A | 10/1994 | Kelsey et al. | |
| 8,285,344 B2* | 10/2012 | Kahn | H03G 3/32 361/56 |
| 9,013,264 B2 | 4/2015 | Parshionikar et al. | |
| 9,462,377 B2* | 10/2016 | Lasch | H03G 3/32 |

(Continued)

OTHER PUBLICATIONS

Hill, Kashmir, "These amazing, futuristic earbuds will allow you to filter out specific sounds around you", Splinter, Nov. 8, 2015, 4 pages, http://fusion.netistory/224892/here-real-world-mute-button/.

(Continued)

*Primary Examiner* — Hemant S Patel
(74) *Attorney, Agent, or Firm* — Ference & Associates LLC

(57) ABSTRACT

One embodiment provides a method, including: creating, for a user, a sound desirability index comprising (i) a plurality of sounds and (ii) desirability of the sound to the user with respect to each of the plurality of sounds, wherein the sound desirability index is created in response to the user hearing a sound and the environment of the user when hearing the sound; receiving an audible input within hearing proximity of the user; identifying the current environment of the user; determining the desirability of the audible input to the user by accessing the sound desirability index, and determining the desirability of the audible input based upon a sound in the audible input and the current environment of the user; and modifying a characteristic of at least a portion of the audible input based upon the desirability of the audible input to the user.

20 Claims, 3 Drawing Sheets

| DESIRABILITY Index | Meeting | Working | Home | Traveling |
|---|---|---|---|---|
| Dog barking | LOW | LOW | MED | MED |
| Phone | LOW | MED | HIGH | HIGH |
| Automobiles | LOW | LOW | LOW | MED |
| Baby crying | LOW | MED | HIGH | HIGH |
| TV | MED | LOW | HIGH | LOW |

(56) References Cited

U.S. PATENT DOCUMENTS

| | | | | |
|---|---|---|---|---|
| 9,716,939 | B2 | 7/2017 | Di Censo et al. | |
| 2010/0253689 | A1* | 10/2010 | Dinicola | H04M 3/567 345/467 |
| 2011/0069843 | A1* | 3/2011 | Cohen | H04S 1/00 381/56 |
| 2011/0095875 | A1* | 4/2011 | Thyssen | G09G 5/10 340/407.1 |
| 2011/0166856 | A1* | 7/2011 | Lindahl | G10L 15/20 704/233 |
| 2011/0289410 | A1* | 11/2011 | Paczkowski | G10L 21/06 715/716 |
| 2011/0295392 | A1* | 12/2011 | Cunnington | G06Q 10/10 700/90 |
| 2011/0300806 | A1* | 12/2011 | Lindahl | G10L 21/0208 455/63.1 |
| 2015/0205572 | A1* | 7/2015 | Holmes | G06F 3/165 715/728 |
| 2016/0125876 | A1* | 5/2016 | Schroeter | G10L 15/20 704/226 |
| 2016/0162254 | A1* | 6/2016 | Benattar | H04R 1/1083 700/94 |
| 2016/0323666 | A1 | 11/2016 | Ajrnera et al. | |
| 2017/0236507 | A1 | 8/2017 | Benattar et al. | |

OTHER PUBLICATIONS

Concha-Barrientos, Marisol et al., "Occupational noise", Environmental Burden of Disease Series, No. 9, 2004, World Health Organization Protection of the Human Environment, Geneva, 41 pages, Environmental Burden of Disease Series.

MacKenzie, DJ, et al., "Noise levels and noise sources in acute care hospital wards", Building Serv. Eng. Res. Technol., 2007, pp. 117-131, 15 pages, vol. 28, Issue 2, SAGE Publications.

Scheirer, Jocelyn et al., "Expression Glasses—A Wearable Device for Facial Expression Recognition", M.I.T., Media Laboratory Perceptual Computing Section Technical Report No. 484, 1999, 3 pages, MIT Media Lab.

Blocks, "The First Customisable Modular Smartwatch", Accessed on Jan. 12, 2018, 8 pages, https://new.chooseblocks.com/discover.

Grifantini, Kristina, "Sensor Detects Emotions through the Skin", MIT Technology Review, Oct. 26, 2010, 12 pages, https://www.technologyreview.com/s/421316/sensor-detects-emotions-through-the-skin/.

Murphy, Samantha, "Microsoft won a patent for goggles that detect feelings of people near you", Mashable, Apr. 30, 2015, 9 pages, http://mashable.com/2015/04/30/microsoft-goggles-feelings/#q.J18AvNZqqb.

* cited by examiner

| DESIRABILITY Index | Meeting | Working | Home | Traveling |
|---|---|---|---|---|
| Dog barking | LOW | LOW | MED | MED |
| Phone | LOW | MED | HIGH | HIGH |
| Automobiles | LOW | LOW | LOW | MED |
| Baby crying | LOW | MED | HIGH | HIGH |
| TV | MED | LOW | HIGH | LOW |

FIG. 2

FILTERING SOUND BASED ON DESIRABILITY

BACKGROUND

People are in many different environments (e.g., workplace, commuting vehicle, home, stores, public locations, etc.) throughout the day. Depending on the type of environment, the environment may include many different noises or sounds. For example, a person in the park may hear birds chirping, construction workers working, children playing, people talking, and the like. As another example, a person at home may hear babies crying, family members talking, televisions playing, phones ringing, and the like. A person may also have devices that create sounds, for example, a music player, cellular phone, audio book, or the like. Thus, the environment of a person can become very noisy.

BRIEF SUMMARY

In summary, one aspect of the invention provides a method, comprising: creating, for a user, a sound desirability index comprising (i) a plurality of sounds and (ii) desirability of the sound to the user with respect to each of the plurality of sounds, wherein the sound desirability index is created in response to the user hearing a sound and the environment of the user when hearing the sound; receiving an audible input within hearing proximity of the user; identifying the current environment of the user; determining the desirability of the audible input to the user by accessing the sound desirability index, and determining the desirability of the audible input based upon a sound in the audible input and the current environment of the user; and modifying a characteristic of at least a portion of the audible input based upon the desirability of the audible input to the user.

Another aspect of the invention provides an apparatus, comprising: at least one processor; and a computer readable storage medium having computer readable program code embodied therewith and executable by the at least one processor, the computer readable program code comprising: computer readable program code configured to create, for a user, a sound desirability index comprising (i) a plurality of sounds and (ii) desirability of the sound to the user with respect to each of the plurality of sounds, wherein the sound desirability index is created in response to the user hearing a sound and the environment of the user when hearing the sound; computer readable program code configured to receive an audible input within hearing proximity of the user; computer readable program code configured to identify the current environment of the user; computer readable program code configured to determine the desirability of the audible input to the user by accessing the sound desirability index, and determining the desirability of the audible input based upon a sound in the audible input and the current environment of the user; and computer readable program code configured to modify a characteristic of at least a portion of the audible input based upon the desirability of the audible input to the user.

An additional aspect of the invention provides a computer program product, comprising: a computer readable storage medium having computer readable program code embodied therewith, the computer readable program code executable by a processor and comprising: computer readable program code configured to create, for a user, a sound desirability index comprising (i) a plurality of sounds and (ii) desirability of the sound to the user with respect to each of the plurality of sounds, wherein the sound desirability index is created in response to the user hearing a sound and the environment of the user when hearing the sound; computer readable program code configured to receive an audible input within hearing proximity of the user; computer readable program code configured to identify the current environment of the user; computer readable program code configured to determine the desirability of the audible input to the user by accessing the sound desirability index, and determining the desirability of the audible input based upon a sound in the audible input and the current environment of the user; and computer readable program code configured to modify a characteristic of at least a portion of the audible input based upon the desirability of the audible input to the user.

A further aspect of the invention provides a method, comprising: generating a sound desirability profile for a specific user, wherein the sound desirability profile comprises a sound profile for the specific user indicating the desirability of particular sounds to the user, for each of the particular sounds; the generating a sound desirability profile comprising: identifying a reaction of the user to a sound; determining a context of the user when hearing the sound; and classifying a desirability of the sound to the user based upon the identified reaction of the user to the sound and the context of the user; receiving audible input comprising at least one sound; and adjusting an audibility level of the sound based upon a desirability of the sound in the audible input to the user determined by comparing the received audible input to the sound desirability profile.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

BRIEF DESCRIPTION OF THE SEVERAL VIEWS OF THE DRAWINGS

FIG. 2 illustrates an example desirability index.

DETAILED DESCRIPTION

Figure 1:
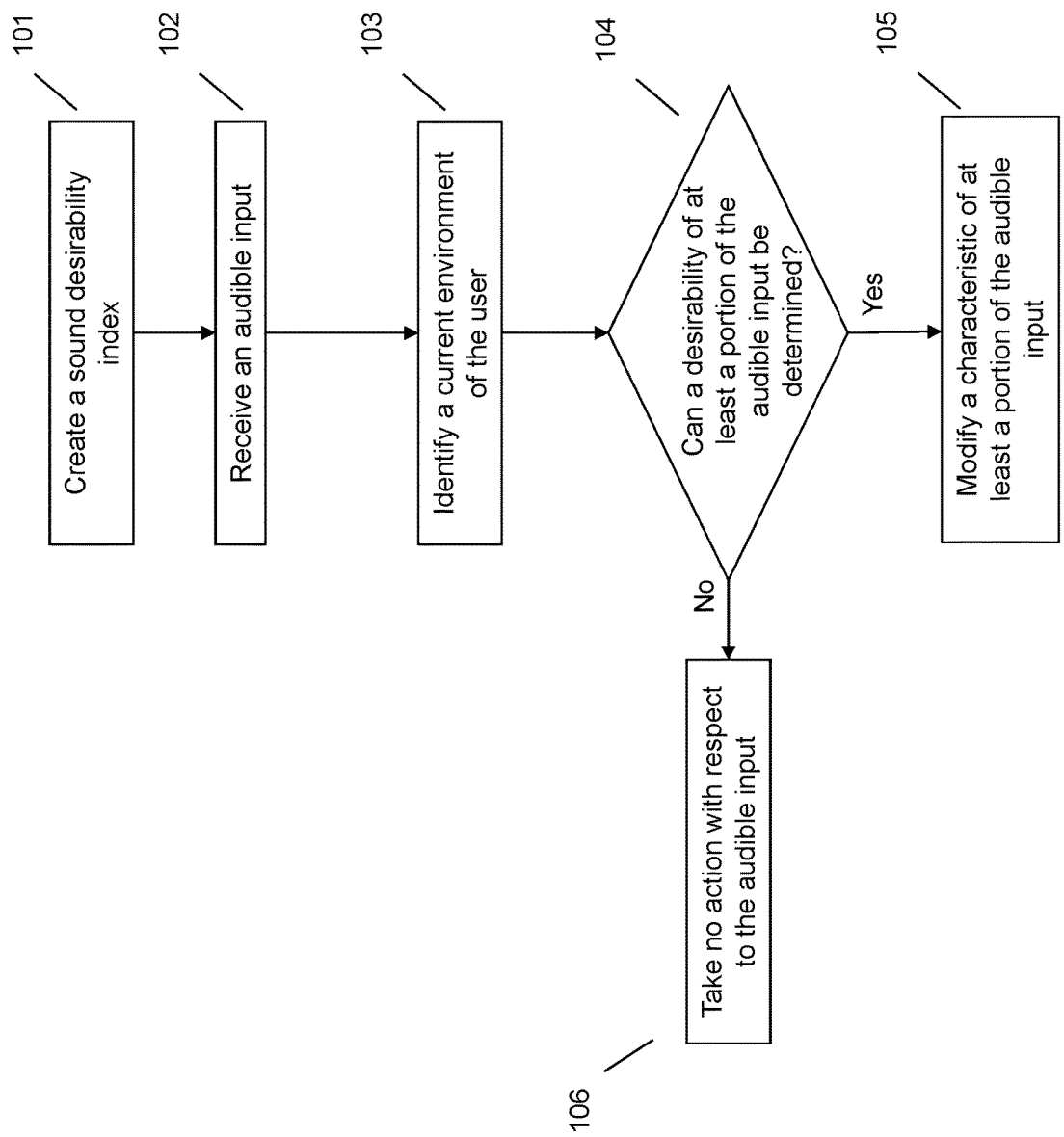
FIG. 1 illustrates a method of filtering sounds based upon a generated desirability index for a user.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-3. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 3. In accordance with an example embodiment, all of the process steps, components and outputs discussed with respect to FIGS. 1-2 can be performed or utilized by way of a processing unit or units and system memory such as those indicated, respectively, at 16' and 28' in FIG. 3, whether on a server computer, a client computer, a node computer in a distributed network, or any combination thereof.

Noisy environments may be very undesirable to a person. For example, too much noise can cause health issues. Additionally, some may be very sensitive to certain noises or sounds. For example, loud noises may be very startling and jarring. Additionally, some may just dislike certain sounds, for example, the sound of train whistles or babies crying. Finally, a person may be engaged in an activity where lots of noises are distracting and do not allow him or her to focus or complete the desired activity. For example, someone may be trying to sleep and noises may prevent the person from sleeping. As another example, someone may be trying to complete a work project and be distracted and thereby prevented from focusing on the project. Thus, noisy environments are undesirable for many individuals. However, some may find certain noises to be desirable in some environments and undesirable in other environments. For example, someone may find hearing a crying baby at home to be acceptable, but hearing a crying baby at work to be unacceptable. As another example, birds chirping in the park may be acceptable to someone who finds birds chirping at work to be unacceptable.

Current solutions for noise reduction or filtering include systems that filter out particular frequencies of sounds. For example, the system may filter out all frequencies above a particular frequency. One problem with this solution is that the filtering is not unique to a particular individual. For example, one person may like a particular sound within a frequency range while another person does not like the same sound. Using conventional techniques the sounds would be either filtered or not filtered based upon the frequency, regardless of the individual. Other solutions may be able to determine the source of the sound and may filter all sounds produced by a particular source. The problem with this solution is that the user has to specifically identify to the system which noise should be filtered or cancelled. The user may be unable to provide such feedback.

Additionally, these conventional techniques filter out all sounds either by matching the particular frequency or based upon the source of the sound. In other words, the conventional techniques do provide for allowance of certain sounds that may fall within the filtered sound range (e.g., within a particular frequency or by a certain sound source), for example, in the case that the particular user would want to hear that sound or finds that sound desirable. That is, the conventional techniques do not allow for a system that is personalized to a particular user. Rather, the conventional techniques behave similarly for all users. Neither of the conventional techniques allows for filtering of sounds in one environment while allowing the same sound in a different environment. In other words, as the user moves from one environment to another environment, conventional systems would not take into account these different environments when filtering out different sounds. Rather, the conventional systems either filter out a noise or allow a noise without regard to the environment of the user.

Accordingly, the techniques and systems as described herein provide a system and technique for modifying a characteristic of audible input based upon a determination of whether the user desires to hear a sound within the audible input using a sound desirability index or profile created for that particular user. The system creates a sound desirability index or profile for a particular user, including different identified sounds, different contexts or environments, and a desirability of the sound within the environment or context to the user. To create the sound desirability index, the system identifies and keeps track of responses of the user to hearing the sound. Some example responses may include facial responses, gestures by the user, audible responses by the user, changes in health metrics, or the like. For example, if the user covers his/her ears with his/her hands when the sound is heard, the system may identify that the user does not like the sound.

Once the sound desirability index has been created, when audible input is provided within hearing proximity to the user, in other words, the user can hear the sound, the system may identify the context or environment of the user and may consult or access the sound desirability index. Based upon the desirability of the sound to the user and within the context as identified in the sound desirability index, the system may modify a characteristic of at least a portion of the audible input. For example, if the audible input includes a dog barking and the user is at work, the system may determine from the sound desirability index that such a sound at work is undesirable to the user and may thereafter filter or at least attenuate the amplitude of the sound. The mechanism for facilitating or effectuating the modification may be a known or conventional mechanism, for example, noise cancelling headphones, noise filtering earbuds, noise modification algorithms provided on information handling devices, or the like. However, the determination of which sounds to modify and how to modify these sounds is unconventional and previously unknown.

Such a system provides a technical improvement over current systems for filtering or reducing noisy environments. The systems and methods as described herein provide a technique for filtering or modifying sounds based upon the particular user hearing the sounds by using a desirability index or profile that is unique for each individual user. In other words, unlike conventional techniques that perform similarly for all users, the systems and methods described herein provide a sound modification technique that can be unique to each individual. Additionally, as opposed to traditional techniques which require the user to specifically identify a sound that is to be filtered, the systems and methods as described herein provide a system that can determine the desirability of a sound based upon a reaction or response of the user to a particular sound. Finally, the systems and methods as described herein provide a system that will react to the same sound differently depending on the environment of the user. For example, if the user hears the sound in one environment the system may filter the sound. However, if the user hears the same sound in a different environment, the system may amplify the sound. Traditional techniques do not provide a system that can distinguish environments where the sound is occurring and perform different actions on the sounds based upon the environment of the user. Therefore, the described systems and methods provide a more accurate, complete, and user-friendly system and method for modifying sounds for a particular individual.

FIG. 1 illustrates a method for modifying a characteristic of an audible input based upon the context of a user hearing the audible input and the desirability of the sound to the user by generating a sound desirability index. At 101 the system creates a sound desirability index. The sound desirability index includes a plurality of sounds and different contexts or environments. Contexts or environments may include different locations that a user may hear a sound. Additionally or alternatively, a context or environment may include different characteristics of an environment. For example, a context may include a time frame (e.g., if the sound is heard in a location at one time it is desirable, but at another time in the same location it is undesirable, etc.), may be based upon other sounds at the location (e.g., if the ambient sound level at the location is high, the sound may be desirable, whereas if the ambient sound level at the location is low, the sound may be undesirable, etc.), may be based upon other people within proximity to the sound (e.g., a sound heard around family members may be acceptable, whereas a sound heard around coworkers is unacceptable, etc.), and the like. The index also includes the desirability of the sound within a particular context or environment to a user or individual. The sound desirability index or profile is unique to a particular individual. In other words, the desirability of a sound within a particular context is specific to the user hearing the sound and the desirability of the sound as identified for or indicated by the particular user.

An example sound desirability index 200 is illustrated in FIG. 2. The illustrated sound desirability index 200 is merely illustrative and may be in many different formats, for example, a table (as shown), a database, a lookup table, a list, or the like. The index 200 includes a plurality of different sounds 201A-201E and a plurality of different environments or contexts 202A-202D. The desirability of the sound within a particular environment is illustrated at the intersections of the rows and columns, for example, the cell 203. As illustrated, a sound heard in one environment may have one desirability, while the same sound heard in a different environment has a different desirability, for example, the desirability of hearing a phone ringing in a meeting for an identified user is low, while the desirability of hearing a phone ringing at home is high.

To create the desirability index, the system may use a bootstrapping technique to learn desirability values. For example, the system may start with a desirability index having set values and then learn the desirability values for a particular user based upon responses by the user to a particular sound within a particular context. The starting desirability index may include a default index. For example, the desirability levels/values may be prepopulated based upon default values. The default values may be selected or determined using crowd-sourcing techniques. For example, the system may receive feedback from a plurality of users and may use this feedback to determine an average desirability, majority desirability, or the like. The plurality of users used to generate a default value may differ based upon the individual that the desirability index is being created for. For example, the users may be grouped by geographical region, language, age, or other characteristic, and users having a characteristic similar to the individual may be used for selection of the default values within the default desirability index for the user.

Alternatively, the beginning point of the index may be a clean index, for example, all desirability values may be set to unknown, may be blank, or some other value that indicates no action should be taken with respect to the sound in the particular context. As another alternative, the user may manually set desirability values. For example, the user may access the desirability index and manually set values for the sounds and the contexts. Additionally, the user may manually overwrite some of the desirability values that may have been previously set. Alternatively, the beginning point of the desirability index may be a combination of one or more of these techniques. For example, some desirability values may be set using crowd-sourcing techniques, some may be manually set by the user, and some may be clean or set to unknown.

The desirability values are then adjusted as the user hears sounds and noises in different environments or contexts. In other words, as the user hears sounds and noises the system uses a supervised learning technique to determine the context of the user, classify the sound type, and derive the level of desirability of the sound within the context by the user. Based upon this learning, the system updates the desirability index. Thus, the system can use a bootstrapping technique to generate values for the desirability index. Additionally, once the desirability index has been generated, the system can update the desirability index based upon responses by the user.

Additionally, once the desirability index has been created the system may periodically test sounds for desirability. For example, if one sound has been indicated or set as undesirable, thereby resulting in the filtering of the sound, the system may allow the sound to be heard by the user in order to determine if the user still finds the sound within the context undesirable. The periodic training may be conducted at particular time intervals (e.g., once a month, once a week, once a year, etc.), responsive to different events (e.g., the user manually changing a particular number of values, a new context is added, etc.), or the like. Additionally or alternatively, the system may periodically compromise a portion or the entirety of the desirability index in order to recheck the desirability level. Compromising the index may include randomly modifying a desirability level of one or more sounds in one or more contexts so that the user may hear a sound that was previously blocked or filtered. Accordingly, since the user hears the sound and can then respond to the sound, the system can determine if the previous desirability level was the correct desirability level. In other words, the system may employ one or more techniques that allow for the system to determine if a set desirability level should be maintained, for example, for a sound that the user would not normally be exposed to based upon a previously set desirability level. The periodic training may be based upon the desirability index aging. In other words, as the desirability index ages, the system may determine that periodic training or compromising should be performed.

In order to derive the level of desirability of a sound by a user within a particular environment, the system may detect audible input including one or more sounds, detect a location, and detect a response of the user to hearing the sound. To determine the location the system may use sensors (e.g., image capture sensors, audio capture sensors, environmental sensors, etc.) to identify the location. For example, the system may capture images of the location to determine that a sign states that the location is a grocery store. As another example, the system may capture images of the environment and compare these images to database images to determine the location is a park. The system may also access one or more information sources to determine the location. For example, the system may access a schedule of the user to determine where the user is supposed to be located. As another example, the system may access proximate devices, for example, smart phones, cellular phones, televisions, wireless routers, global positioning systems, and the like, to obtain information about the location of the user. The location can then be compared to or added as a context of the desirability index. For other context types, other sources may be accessed, for example, a clock or information handling device having the time may be accessed to determine a current time, proximate device identifiers may be accessed to identify other people within the vicinity, and the like.

To determine the desirability of the sound to the user within the context, the system may capture and analyze responses of the user to the sound. One response that may be captured may include a gesture provided by the user. For example, if a user makes or provides a gesture that indicates the user does not like the sound (e.g., a covering ears gesture, a stop gesture, a head shaking gestures, etc.), the system may identify the sound as undesirable within the context. If, on the other hand, the user makes or provides a gesture that indicates the user does like the sound (e.g., leaning towards the sound, smiling in response to the sound, a head nodding gesture, etc.), the system may identify the sound as desirable within the context. It should be understood that the gestures provided by the user do not have to be gestures that are preprogrammed to indicate a desirability. In other words, the system works using gestures that the user may automatically make in response to a sound and the system learns what these gestures indicate with respect to a desirability (e.g., whether that gesture is a gesture indicating undesirability, a gesture indicating desirability, or a gesture that indicates neither a desirability or an undesirability).

Another response of the user that may be used to determine desirability is a facial response of the user to the sound. For example, if the user makes a face that indicates the user does not like the sound, the system may determine that the sound is undesirable. If, however, the user makes a face that indicates the user does like the sound, the system may determine that the sound is desirable. The system does not require a preprogrammed facial response to make a desirability determination. In other words, like the gesture, the user does not have to perform a specific facial response in order to indicate desirability. Rather, the user can respond to hearing the sound naturally and the system can determine the desirability indicated by the natural response. Similarly, the system may use audible responses provided by the user to determine a desirability of the sound. For example, if the user makes a noise indicating undesirability, the system may determine the sound is undesirable. Conversely, if the user makes a noise indicating desirability, the system may determine the sound is desirable. Like the other responses, the audible responses do not have to be preprogrammed responses within the system.

The system may also use changes in health metrics as responses for determining desirability. For example, if the user does not like a sound, the user's blood pressure may increase which may indicate that the sound is undesirable. As another example, when a user hears a desirable sound the user's heartrate may decrease which may indicate that the sound is desirable. Other responses to sounds to determine desirability are possible and contemplated. Additionally, the system may also use other sources to determine a desirability of a particular sound. For example, if a user is going into a meeting room and the meeting room door has a sign that states "No Cellular Phones" the system may determine that the desirability of a phone ringing within the environment is low. Additionally, the system may use a combination of responses to determine a desirability of a sound to the user.

In the case that more than one sound is heard at a time, the system may identify responses of the user immediately after the user hears the sound in order to distinguish a desirability of one sound from a desirability of another sound. For example, if the user is in a park and hears birds chirping, the user may respond to this sound as if it is a desirable sound. The user may then hear a jackhammer from a construction worker and may respond to this sound in a manner that indicates it is undesirable. Accordingly, the system is able to distinguish which response is attributable to which sound and, therefore, the desirability of each sound to the user. If the system is unable to distinguish which response corresponds to which sound, the system may take no action with regards to either sound in order to prevent false positives or false negatives. If, however, the user responds to all the sounds that are within proximity in a manner that indicates all the sounds have the same desirability, the system may attribute this desirability to all audible sounds, rather than attempting to distinguish which response corresponds to which sound.

At 102 the system may receive an audible input within hearing proximity of the user. In other words, the system may determine that a noise or sound is able to be heard by the user. The audible input may include more than one sound. For example, if the user is at home the audible input may include sound from a television, sound from a family member, and a dog barking. The system is able to discern each of these sound sources, including any variations in the sound. For example, one dog may provide a high-pitched bark and another dog may provide a deep bark. However, the system is able to determine that the source of both sounds is a general category of dog. Alternatively, if the user has indicated that the particular type of bark has different desirability values, the system may not group the barks into a general sound source of "dog". The system classifies each of these sounds or sound sources into categories that are or may be included within the sound desirability index.

At 103 the system may identify a current environment or context of the user. Like the sounds and/or sound sources, the system may classify the current environment or context into categories or types that are or may be included within the sound desirability index. To determine the context or environment, the system may use the same or similar techniques to those that were used to generate or create sound desirability index, for example, using sensors, accessing information sources, accessing information handling devices, or the like.

At 104 the system may determine whether a desirability of at least a portion of the audible input with respect to the current context of the user can be determined. Determining the desirability of at least a portion of the audible input may include comparing the sound(s) discerned within the audible input with respect to the current environment of the user to the sound desirability index. In other words, the system may access the sound desirability index that has been created for the particular user and determine the identified desirability of the sound within the current context to the user. At this point, the system may also identify a response of the user to hearing the sound in order to assist in updating the sound desirability index. On the other hand, the system may not identify the response of the user to the sound, for example, to reduce processing resource requirements, power resource requirements, or the like.

Additionally, the system may determine if an exception to an identified desirability should be implemented. For example, each or some sound sources may include a calculated or identified importance score. This importance score may overwrite an identified desirability. As an example, if a person is in a meeting where a cell phone ringing has been identified as undesirable, the system may determine that a phone call from a particular person has a high importance score and thereby overwrites the indicated undesirability of the cell phone ringing in the meeting. The importance score may also be based upon context or content of the sound source. For example, if a radio at home has been identified as undesirable, the system may determine that the radio is providing audio content related to a dramatic event, thereby having a high importance score that overwrites the desirability value.

If the desirability of at least a portion of the audible input cannot be determined at 104, the system may take no action with respect to the audible input at 106. Additionally or alternatively, if the system can make no determination with regards to a desirability of a portion of the audible input, the system may take no action with respect to that particular portion of the audible input. Additionally, the system may use this information to update the desirability index.

If, however, the system can make a determination with regards to the desirability of at least a portion of the audible input at 104, the system may modify a characteristic of the a least a portion of the audible input at 105. Determining what modification to make to the characteristic may be based upon using an unsupervised learning technique that maps events to actions. This learning module may continuously learn what actions to map to which desirability values. Modifying a characteristic may include modifying an amplitude or volume of the sound or portion of the audible input. For example, if the system determines that the audible input includes an undesirable sound, the system may mute or filter the sound out from the audible input so that the user does not hear the sound at all. Alternatively, the system may merely attenuate or lower the volume or amplitude of the sound so that it is not as loud to the user.

On the other hand, if the system identifies that at least a portion of the audible input is desirable, the system may take no action with respect to that sound. In other words, the system may not filter out the sound, thereby allowing the user to hear the sound. Alternatively, if the sound is found to be desirable, the system may amplify or increase the volume or amplitude of the sound, thereby making the sound louder to the user. The system may modify characteristics of sounds within the audible input differently, for example, one sound may be filtered out while another sound is not filtered or is amplified. Different desirability values may result in different characteristic modifications. Additionally, the same desirability value for different sounds may have different characteristic modifications, for example, one undesirable sound may be filtered while another undesirable sound is attenuated. The modification and the characteristic that is modified may be identified or set by the user.

Thus, the systems and methods as described herein provide a technique for modifying sound characteristics based upon the sound source, the current context of the user hearing the sound, and the particular user that is hearing the sound. Using a desirability index that is created to be for a unique or particular individual allows the systems and methods as described herein to provide a system that is more user friendly, is personalized to the user, and that automatically identifies whether a sound is desirable to the user within a particular context based upon a response of the user to the sound.

Figure 3:
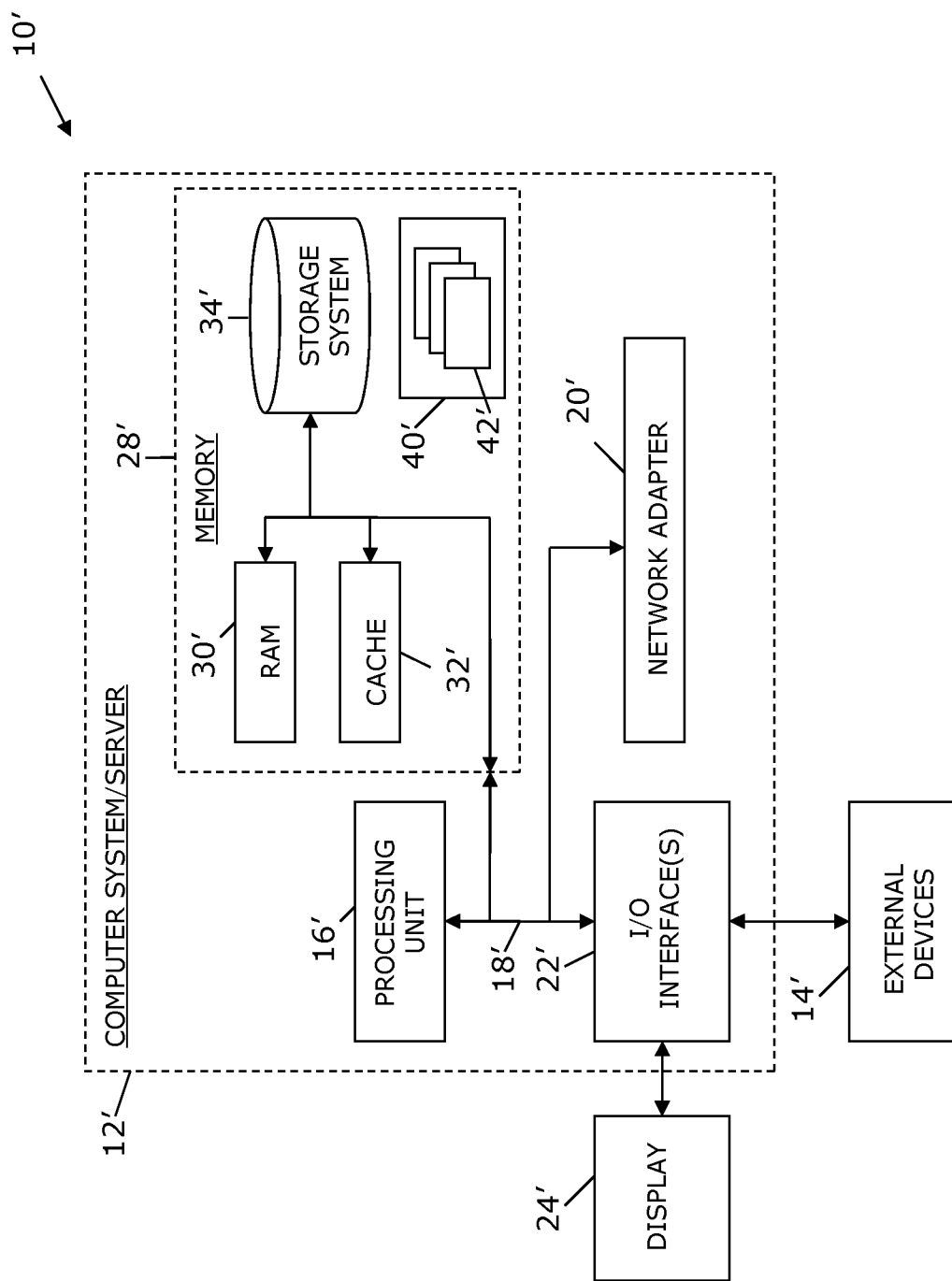
FIG. 3 illustrates a computer system.

As shown in FIG. 3, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
creating, for a user, a sound desirability index unique to the user, wherein the sound desirability index comprises (i) a plurality of sounds and (ii) desirability of the sound to the user with respect to each of the plurality of sounds, wherein the sound desirability index is automatically populated (a) with a desirability of sounds based upon a response by the user to the user hearing a given sound and (b) correlated to an environment of the user when hearing the given sound, wherein a desirability of the given sound is based upon an environment the given sound is heard within and wherein the desirability of the given sound changes within different environments, wherein the response by the user comprises a physical reaction of the user upon hearing the given sound and wherein at least a portion of the physical reaction of the user is captured using at least one of: an image capture device, an audio capture device, and a biometric sensor;
receiving an audible input within hearing proximity of the user;
identifying the current environment of the user;
determining the desirability of the audible input to the user by accessing the sound desirability index, and determining the desirability of the audible input based upon a sound in the audible input and the current environment of the user; and
modifying a characteristic of at least a portion of the audible input based upon the desirability of the audible input to the user.

2. The method of claim 1, wherein the creating a sound desirability index comprises using a supervised learning technique to classify desirability of each sound in view of a response by the user.

3. The method of claim 1, wherein the physical reaction of the user comprises a physical reaction selected from the group consisting of: an audible response, a gesture response, a facial response, and a health metric response.

4. The method of claim 1, wherein the creating a sound desirability index comprises receiving user input setting a desirability level of at least one sound.

5. The method of claim 1, wherein the creating a sound desirability index comprises updating a default sound desirability index.

6. The method of claim 1, wherein a desirability of the sound to the user is different for different environments of the user.

7. The method of claim 1, wherein the determining a desirability of the audible input comprises determining an importance score for a sound within the audible input.

8. The method of claim 1, wherein the modifying a characteristic comprises filtering the audible input.

9. The method of claim 1, wherein the modifying a characteristic comprises filtering a sound within the audible input that is determined to be undesirable, and not filtering a second sound within the audile input that is determined to be other than undesirable.

10. The method of claim 1, wherein the modifying a characteristic comprises increasing the volume of a sound within the audible input that is determined to be desirable.

11. An apparatus, comprising:
at least one processor; and
a non-transitory computer readable storage medium having computer readable program code embodied therewith and executable by the at least one processor, the computer readable program code comprising:
computer readable program code configured to create, for a user, a sound desirability index unique to the user, wherein the sound desirability index comprises (i) a plurality of sounds and (ii) desirability of the sound to the user with respect to each of the plurality of sounds, wherein the sound desirability index is automatically populated (a) with a desirability of sounds based upon a response by the user to the user hearing a given sound and (b) correlated to an environment of the user when hearing the given sound, wherein a desirability of the given sound is based upon an environment the given sound is heard within and wherein the desirability of the given sound changes within different environments, wherein the response by the user comprises a physical reaction of the user upon hearing the given sound and wherein at least a portion of the physical reaction of the user is captured using at least one of: an image capture device, an audio capture device, and a biometric sensor;
computer readable program code configured to receive an audible input within hearing proximity of the user;
computer readable program code configured to identify the current environment of the user;
computer readable program code configured to determine the desirability of the audible input to the user by accessing the sound desirability index, and determining the desirability of the audible input based upon a sound in the audible input and the current environment of the user; and computer readable program code configured to modify a characteristic of at least a portion of the audible input based upon the desirability of the audible input to the user.

12. A computer program product, comprising:

a non-transitory computer readable storage medium having computer readable program code embodied therewith, the computer readable program code executable by a processor and comprising:

computer readable program code configured to create, for a user, a sound desirability index unique to the user, wherein the sound desirability index comprises (i) a plurality of sounds and (ii) desirability of the sound to the user with respect to each of the plurality of sounds, wherein the sound desirability index is automatically populated (a) with a desirability of sounds based upon a response by the user to the user hearing a given sound and (b) correlated to an environment of the user when hearing the given sound, wherein a desirability of the given sound is based upon an environment the given sound is heard within and wherein the desirability of the given sound changes within different environments, wherein the response by the user comprises a physical reaction of the user upon hearing the given sound and wherein at least a portion of the physical reaction of the user is captured using at least one of: an image capture device, an audio capture device, and a biometric sensor;

computer readable program code configured to receive an audible input within hearing proximity of the user;

computer readable program code configured to identify the current environment of the user;

computer readable program code configured to determine the desirability of the audible input to the user by accessing the sound desirability index, and determining the desirability of the audible input based upon a sound in the audible input and the current environment of the user; and computer readable program code configured to modify a characteristic of at least a portion of the audible input based upon the desirability of the audible input to the user.

13. The computer program product of claim 12, wherein the creating a sound desirability index comprises using a supervised learning technique to classify desirability of each sound in view of a response by the user.

14. The computer program product of claim 12, wherein the physical reaction of the user comprises a physical reaction selected from the group consisting of: an audible response, a gesture response, a facial response, and a health metric response.

15. The computer program product of claim 12, wherein the creating a sound desirability index comprises receiving user input setting a desirability level of at least one sound.

16. The computer program product of claim 12, wherein the creating a sound desirability index comprises updating a default sound desirability index.

17. The computer program product of claim 12, wherein the determining a desirability of the audible input comprises determining an importance score for a sound within the audible input.

18. The computer program product of claim 12, wherein the modifying a characteristic comprises filtering a sound within the audible input that is determined to be undesirable, and not filtering a second sound within the audile input that is determined to be other than undesirable.

19. The computer program product of claim 12, wherein the modifying a characteristic comprises increasing the volume of a sound within the audible input that is determined to be desirable.

20. A method, comprising:

generating a sound desirability profile for a specific user, wherein the sound desirability profile comprises a sound profile for the specific user indicating the desirability of particular sounds to the user, for each of the particular sounds, wherein the generating a sound desirability profile is automatically populated (i) with a desirability of a given sound is based upon a physical reaction of the user to hearing the given sound and (ii) correlated to a context of the user when hearing the given sound, and wherein the desirability of the given sound changes within different contexts;

the generating a sound desirability profile comprising:

identifying a physical reaction of the user to hearing a sound and wherein at least a portion of the physical reaction is captured using at least one of: an image capture device, an audio capture device, and an biometric sensor;

determining a context of the user when hearing the sound, wherein a desirability of the sound is based upon the context of the user and wherein a desirability of the sound change within different contexts; and classifying a desirability of the sound to the user based upon the identified physical reaction of the user to the sound and the context of the user;

receiving audible input comprising at least one sound; and adjusting an audibility level of the sound based upon a desirability of the sound in the audible input to the user determined by comparing the received audible input to the sound desirability profile.

* * * * *